United States Patent
Huang

(10) Patent No.: US 8,486,320 B2
(45) Date of Patent: Jul. 16, 2013

(54) SPINDLE MOTOR TRAY ADHESIVE DISPENSING METHOD AND SUPPLEMENTARY APPARATUS

(75) Inventor: David Huang, Chang-Hua County (TW)

(73) Assignee: Tricore Corporation, Chang-Hua County (TW)

( * ) Notice: Subject to any disclaimer, the term of this patent is extended or adjusted under 35 U.S.C. 154(b) by 77 days.

(21) Appl. No.: 13/170,457

(22) Filed: Jun. 28, 2011

(65) Prior Publication Data

US 2012/0000418 A1  Jan. 5, 2012

(51) Int. Cl.
*B32B 37/00* (2006.01)

(52) U.S. Cl.
USPC ........... 264/251; 264/259; 264/260; 264/263; 264/273; 264/274; 264/294; 720/715; 720/716; 720/717

(58) Field of Classification Search
USPC ................. 264/259, 273, 274, 263, 294, 251, 264/260; 720/715–717
See application file for complete search history.

(56) References Cited

U.S. PATENT DOCUMENTS

| 5,995,480 A | * | 11/1999 | Naka et al. | ..................... 720/716 |
| 2010/0192169 A1 | * | 7/2010 | Takeuchi et al. | ............... 720/703 |

\* cited by examiner

*Primary Examiner* — Christina Johnson
*Assistant Examiner* — Saeed Huda
(74) *Attorney, Agent, or Firm* — Browdy and Neimark, PLLC

(57) ABSTRACT

A spindle motor tray adhesive dispensing method and supplementary apparatus is disclosed. The apparatus includes a base block and a pressure block. The base block supports the tray to be processed, having a blind hole for receiving one end of the center axle of the tray and three adhesive troughs around the blind hole. The pressure block pressed on the tray above the base block and axially movable relative to the base block, having a guide hole for receiving the other end of the center axle of the tray. An open space is defined above the base block around the pressure block within which an adhesive dispenser is movable to dispense a polymer adhesive to the through holes on the tray and the adhesive troughs of the base block to form rubber pads at the tray when cured.

2 Claims, 6 Drawing Sheets

SPINDLE MOTOR TRAY ADHESIVE DISPENSING METHOD AND SUPPLEMENTARY APPARATUS

BACKGROUND OF THE INVENTION

1. Field of the Invention

The present invention relates to spindle motor fabrication technology and more particularly, to a spindle motor tray adhesive dispensing method and a supplementary apparatus used in this method.

2. Description of the Related Art

Spindle motor is inventively used in many different fields. A regular CD-ROM uses a spindle motor to rotate a CD disk. A spindle motor for this purpose generally comprises a stator and a rotor. The rotor has an annular rubber pad located on the outer surface thereof for carrying the CD disk to be played by means of friction. Subject to the friction resistance between the annular rubber pad and the CD disk, the CD disk is positively rotated with the rotor.

Further, the rotor has a tray at the outer side thereof for holding the annular rubber pad. The tray comprises a tray body and an axle. The axle is fastened to an axle hole at the center of the tray body. During fabrication, the axle is press-fitted into the axle hole of the tray body, and then the annular rubber pad is attached to the surface of the tray body. According to this fabrication method, it is difficult to accurately control the perpendicularity between the top surface of the annular rubber pad and the axle, affecting the quality of the spindle motor.

SUMMARY OF THE INVENTION

The present invention has been accomplished under the circumstances in view. It is the main object of the present invention to provide a spindle motor tray adhesive dispensing method and supplementary apparatus, which increases the perpendicularity between the top wall of each rubber pad at the tray for spindle motor and the axle at the center of the tray, improving the spindle motor yield rate.

To achieve this and other objects of the present invention, a spindle motor tray adhesive-dispensing supplementary apparatus is used with an adhesive dispenser to dispense a polymer adhesive to a tray comprising a tray body having a plurality of through holes and an axle located at the center of said tray body. The spindle motor tray adhesive-dispensing supplementary apparatus comprises a base block for supporting the tray for processing, the base block defining a blind hole and at least one adhesive trough at a top wall thereof, the blind hole being adapted for receiving the axle of the tray to be processed; and a pressure block suspending above the base block and vertically movable relative to the base block, the pressure block comprising a guide hole cut through opposing top and bottom walls thereof and kept in axial alignment with the blind hole of the base block and adapted for receiving the axle of the tray to be processed; wherein an open space is defined above the base block around the pressure block for allowing movement of the adhesive dispenser therein to dispense a polymer adhesive to each through hole of the loaded tray and the at least one adhesive trough of the base block.

Further, the base block comprises a plurality of adhesive troughs spaced around the blind hole.

The spindle motor tray adhesive-dispensing supplementary apparatus further comprises a positioning pin vertically movably mounted in the guide hole of the pressure block, a spring member mounted in the blind hole of the base block, and a support pin mounted in the blind hole of the base block and supported on the spring member for supporting the axle of the tray to be processed. The positioning pin comprises a pin shaft inserted into the guide hole of the pressure block, and a head located on one end of the pin shaft and stoppable at the top side of the pressure block outside the guide hole. The base block comprises at least one insertion hole, and at least one insertion member respectively inserted into the at least one insertion hole, each the insertion member having a top wall thereof defining one respective adhesive trough at the top wall of the base block. Each insertion member comprises a plurality of grooves located on the top wall thereof.

Further, the spindle motor tray adhesive dispensing method comprises the steps of: (a) sandwiching a tray between a base block and a pressure block to keep an open space above the base block and around the pressure block, wherein the base block comprises at least one adhesive trough; the tray comprises a tray body having at least one through hole corresponding to the at least one adhesive trough, and an axle at the center of the tray body; (b) moving an adhesive dispenser into the open space above the base block and around the pressure block and then operating the adhesive dispenser to dispense a polymer adhesive to the at least one through hole of the tray and the at least one adhesive trough of the base block; and (c) removing the base block and the pressure block from the tray after curing of the dispensed polymer adhesive. Further, the base block used in the step (a) comprises a blind hole for receiving one end of the axle of the tray, a spring member mounted in the blind hole, and a support pin supported on the spring member in the blind hole and stopped against the axle of the tray.

BRIEF DESCRIPTION OF THE DRAWINGS

Other features and advantages of the present invention will be understood by reference to the following specification in conjunction with the accompanying drawings, which like reference signs denote like elements of the structure.

DETAILED DESCRIPTION OF THE INVENTION

Figure 1:
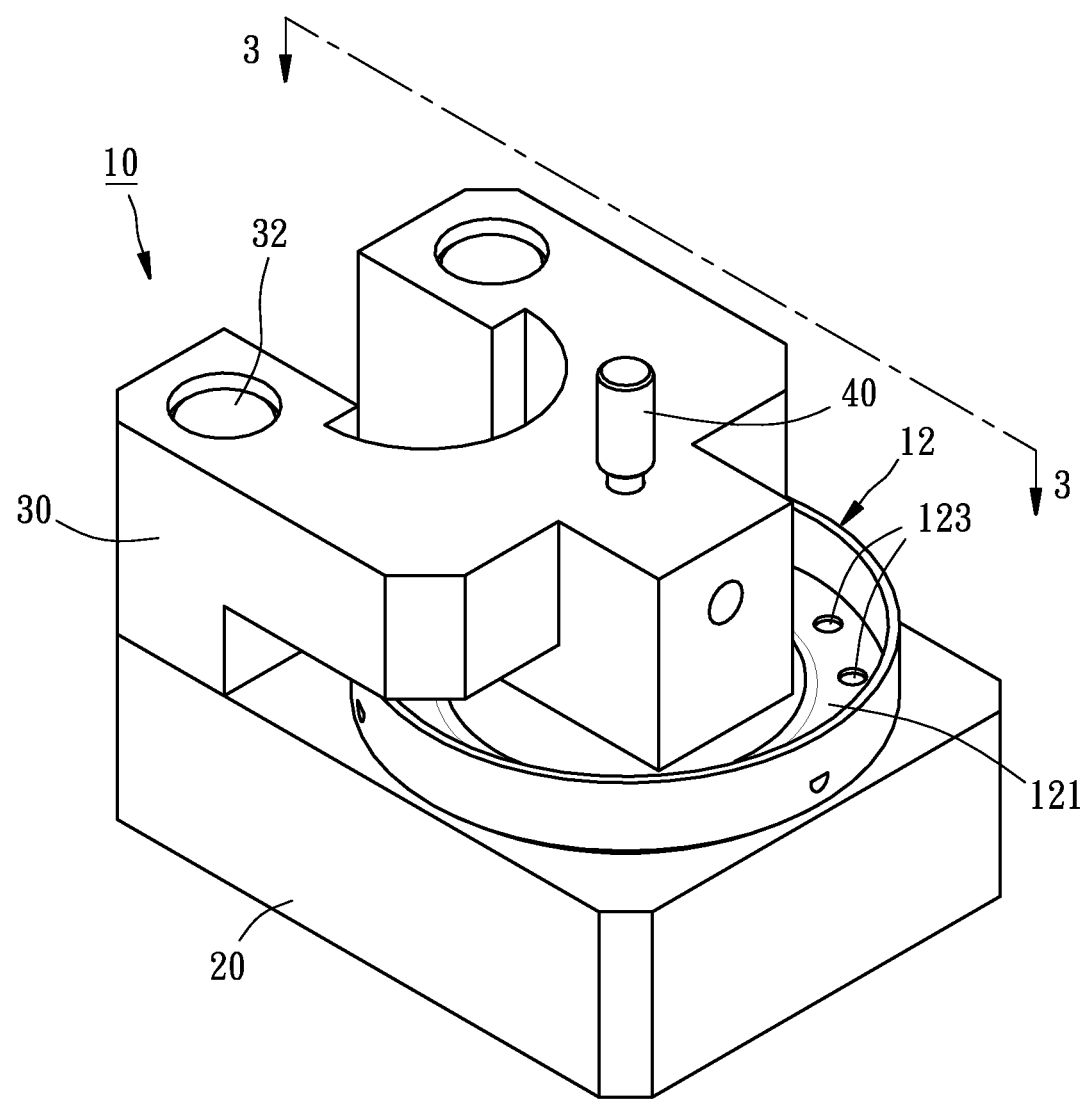
FIG. 1 is an oblique elevation of a spindle motor tray adhesive-dispensing supplementary apparatus in accordance with the present invention.
Figure 2:
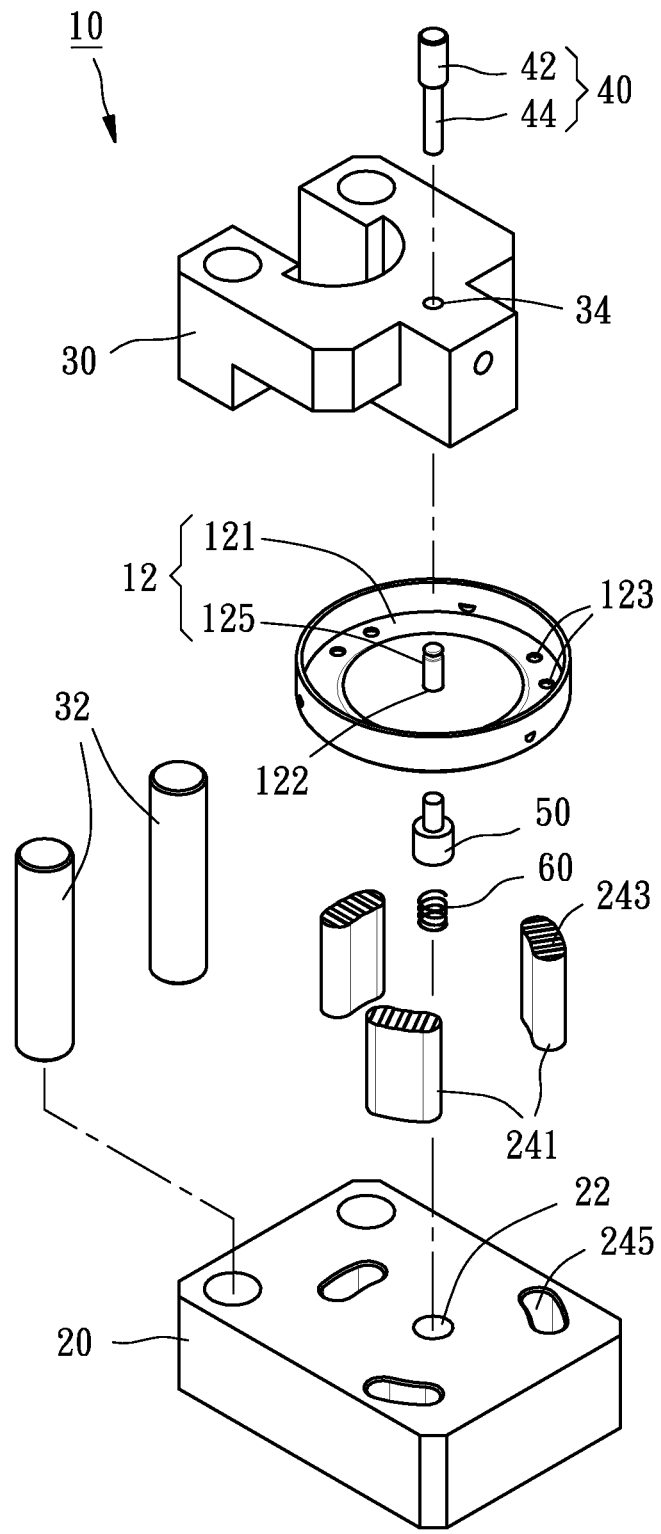
FIG. 2 is an exploded view of the spindle motor tray adhesive-dispensing supplementary apparatus in accordance with the present invention.
Figure 3:
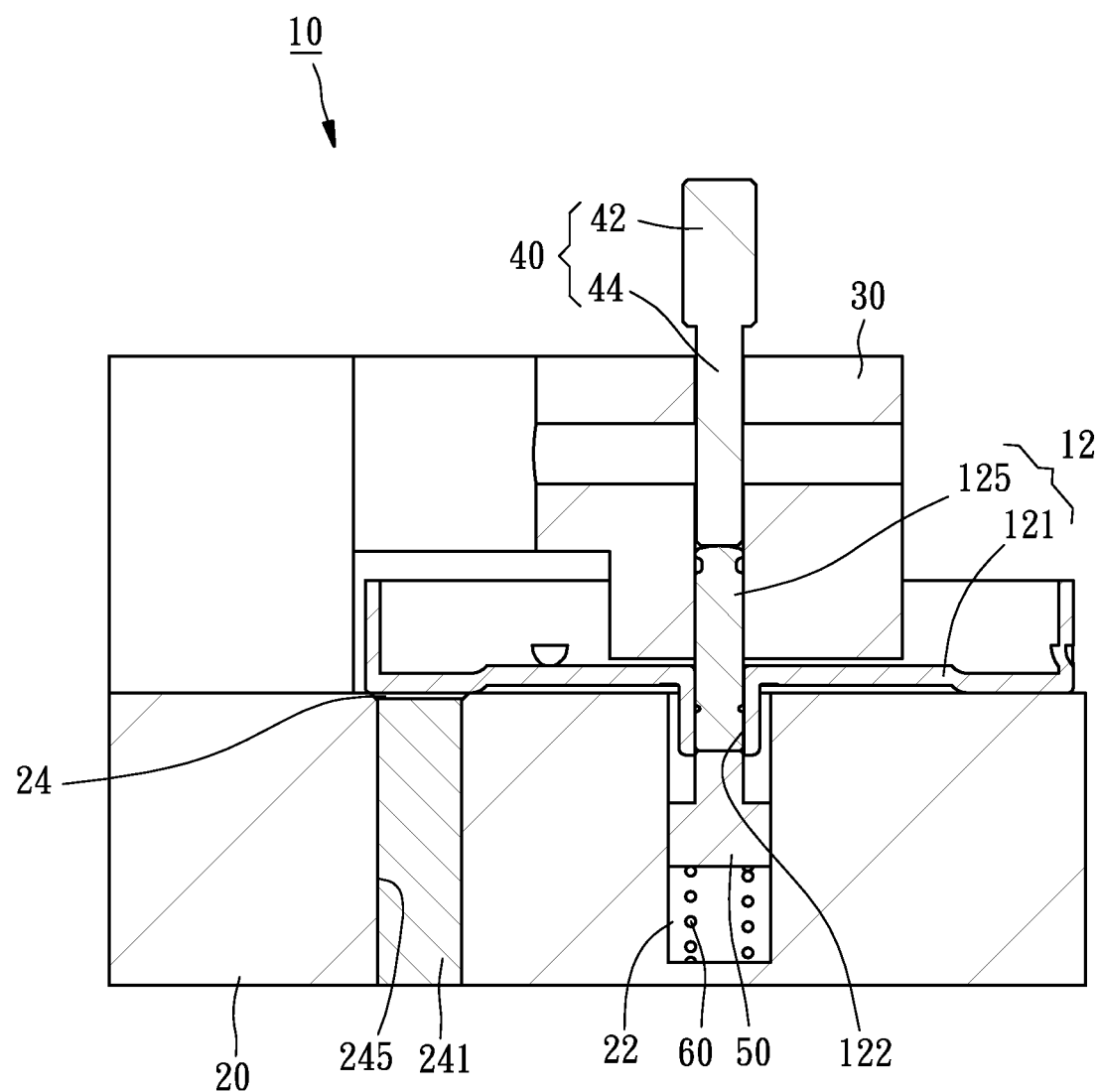
FIG. 3 is a sectional view taken along line 3-3 of FIG. 1.

Referring to FIGS. 1-3, a spindle motor tray adhesive-dispensing supplementary apparatus 10 in accordance with the present invention is shown comprising a base block 20, a pressure block 30, a positioning pin 40, a support pin 50 and a spring member 60.

Figure 5:
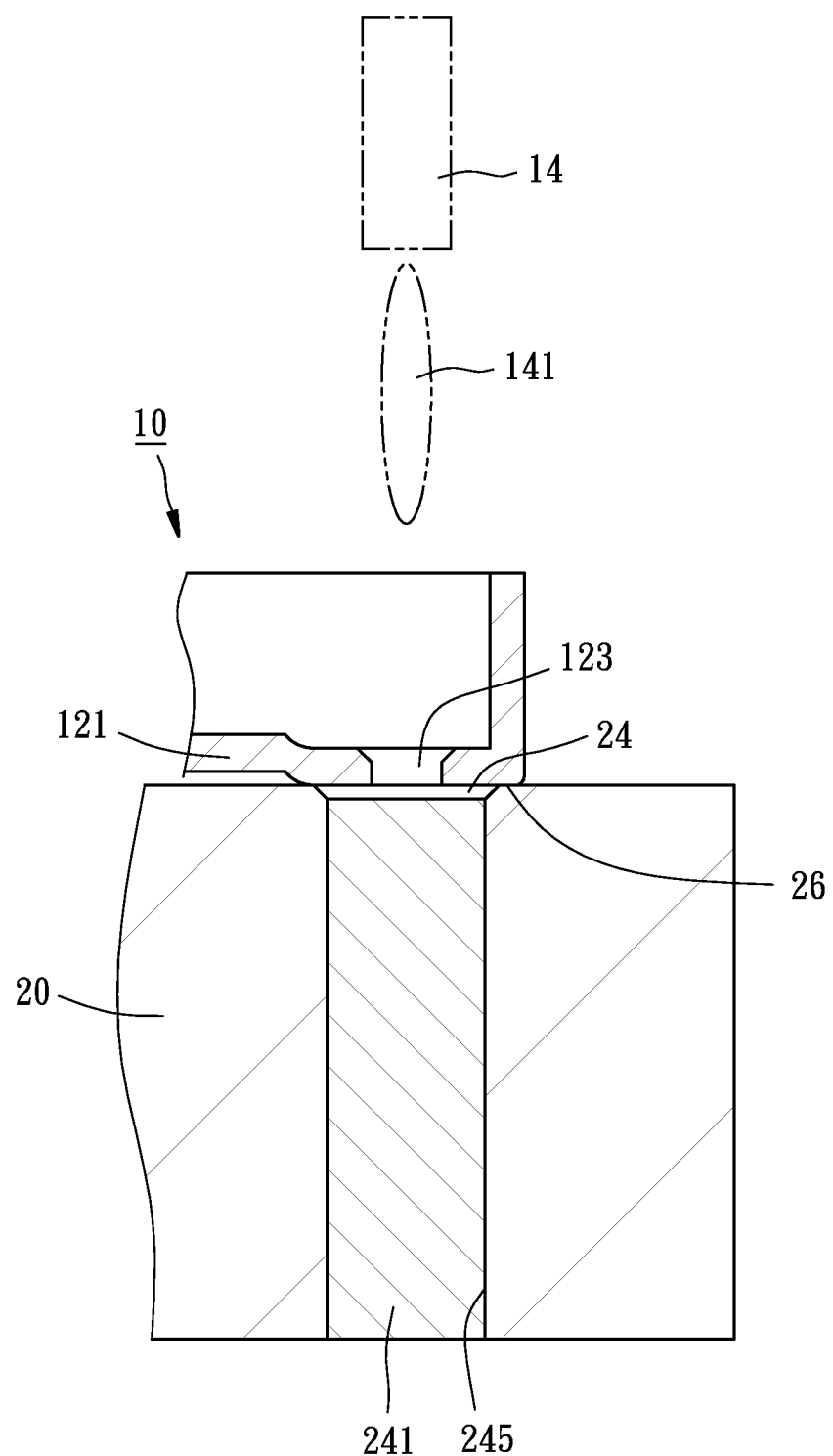
FIG. 5 is a schematic sectional view in an enlarged scale of a part of the present invention, illustrating a status of the polymer adhesive dispensing operation.

The base block 20 defines a blind hole 22 and three insertion slots 245. The insertion slots 245 are equiangularly spaced around the blind hole 22. A respective insertion member 241 is press-fitted into each insertion slot 245, defining a respective adhesive trough 24 at the top side thereof (see FIG. 5). Each insertion slot 245 has the top edge thereof chamfered or tapered. Each insertion member 241 has a plurality of grooves 243 located on the top wall thereof.

The pressure block 30 is coupled to two parallel upright posts 32 at the top side of the base block 20 and movable up and down along the upright posts 32, having a guide hole 34 vertically cut through opposing top and bottom sides thereof and kept in axial alignment with the blind hole 22.

The positioning pin 40 is vertically movably mounted in the pressure block 30, having a pin shaft 44 and a pin head 42. The pin shaft 44 is axially movably inserted into the guide hole 34 of the pressure block 30. The pin head 42 is located on one end of the pin shaft 44 and stoppable at the top wall of the pressure block 30 outside the guide hole 34.

The support pin 50 is inserted into the blind hole 22 of the base block 20 and movable up and down in the blind hole 22.

The spring member 60 is inserted into the blind hole 22 of the base block 20 and stopped between the bottom wall of the blind hole 22 and the bottom edge of the support pin 50.

The aforesaid component parts of the invention facilitate machining and grinding operations, so that dimensional control can easily and precisely achieved.

Figure 6:
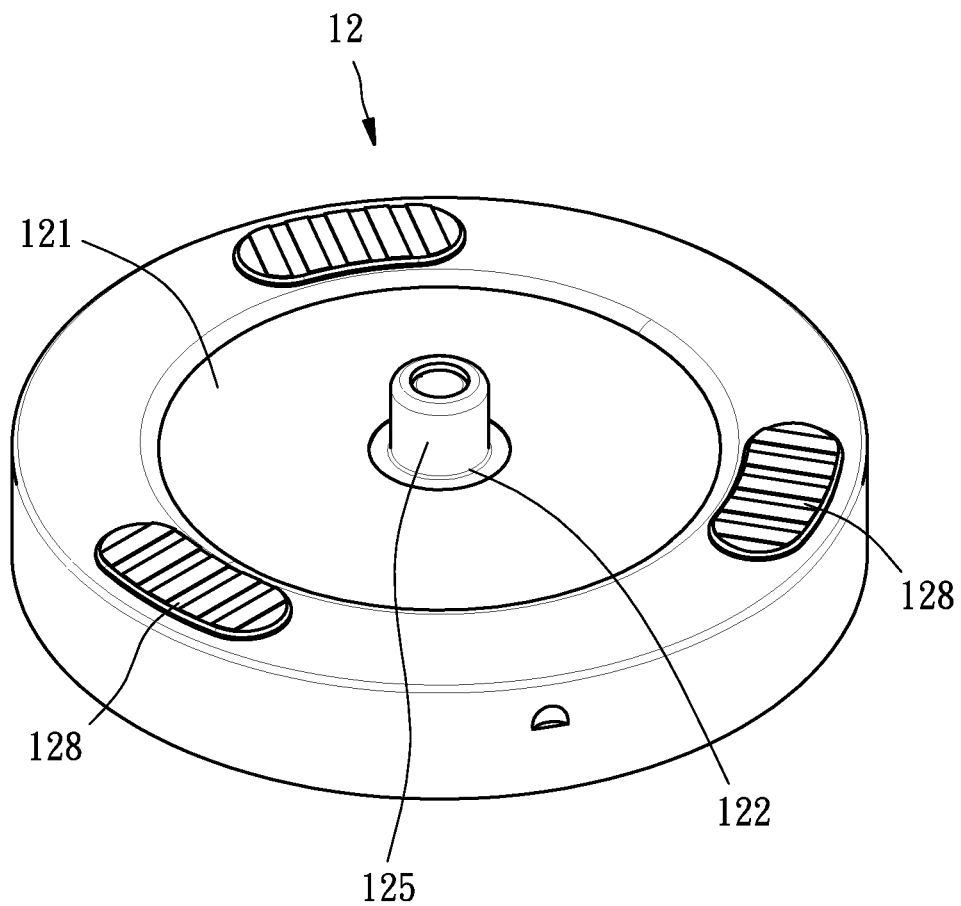
FIG. 6 is an elevational view of a finished spindle motor tray according to the present invention.

The spindle motor tray adhesive-dispensing supplementary apparatus 10 is to be used with an adhesive dispenser 14 (see FIG. 5) to make rubber pads 128 at a tray 12 for spindle motor (see FIG. 6). The tray 12 comprises a disk-like tray body 121 having a center pinhole 122 and a plurality of through holes 123 spaced around the center pinhole 122, and an axle 125 press-fitted into the center pinhole 122. The axle 125 has a diameter slightly smaller than the diameter of the center pinhole 122. When the axle 125 is press-fitted into the center pinhole 122, it is firmly secured to the disk-like tray body 121.

Further, the pressure block 30 has a substantially Y-shaped profile, defining a plurality of open spaces corresponding to the through holes 123 for the access of the adhesive dispenser 14.

Figure 4:
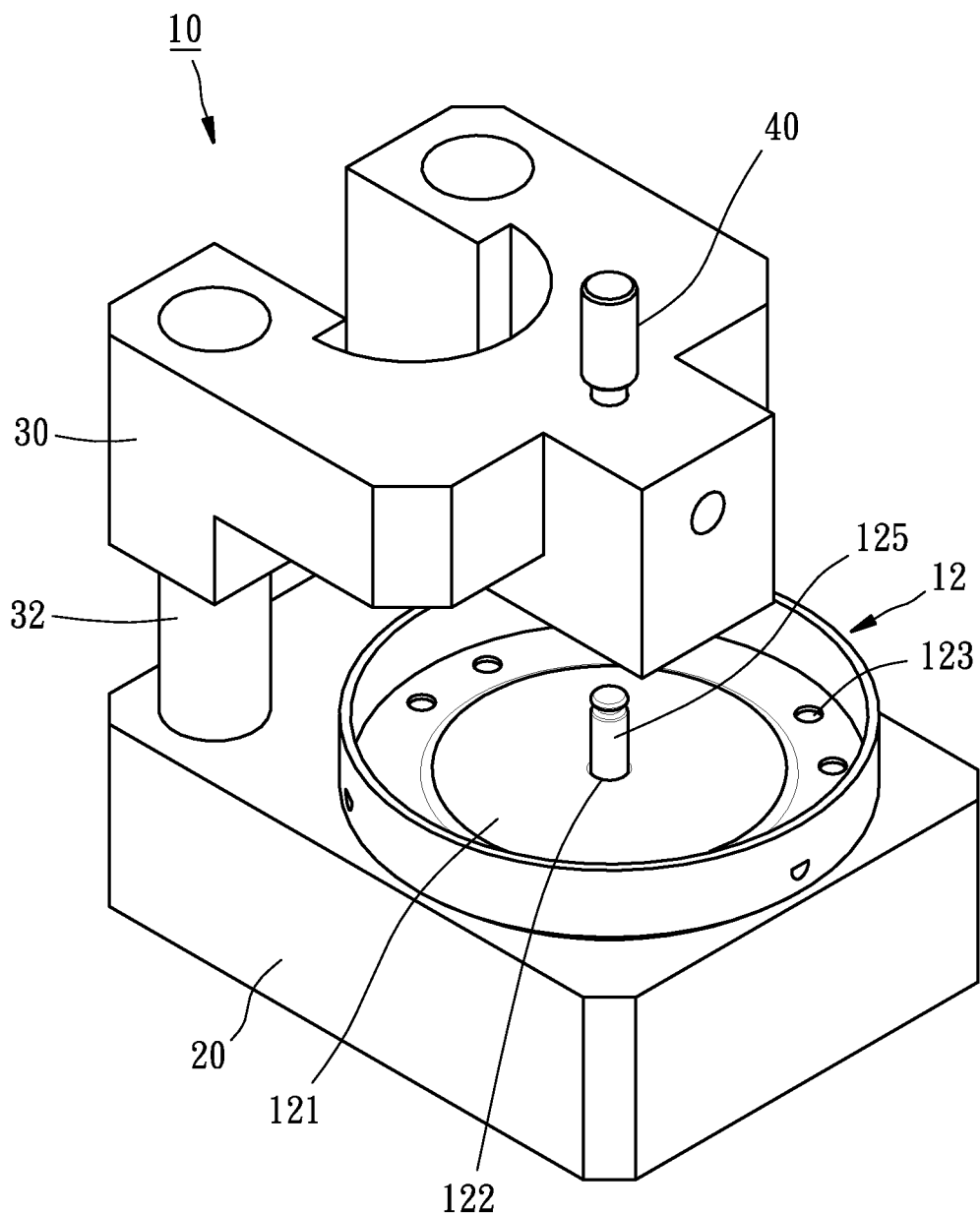
FIG. 4 is an elevational applied view of the present invention, illustrating a status of the polymer adhesive dispensing operation.

During application of the spindle motor tray adhesive-dispensing supplementary apparatus 10, the tray 12 placed on the top side of the base block 20 (see FIG. 4) to force the axle 125 into the blind hole 22 against the support pin 50 and to aim the through holes 123 at the respective adhesive troughs 24, keeping the disk-like tray body 121 in close contact with the top wall of the base block 20. Thereafter, lower the pressure block 30 (see FIG. 1 and FIG. 3) to let the tray 12 be sandwiched between the base block 20 and the pressure block 30. At this time, an open space is defined at the top side of the base block 20 and the tray 12 around the pressure block 30.

At this time, move the positioning pin 40 downwardly along the guide hole 34 to force the axle 125 of the tray 12 downwardly relative to the pinhole 122, adjusting the relative position between the tray body 121 and the axle 125. At this time, the adhesive dispenser 14 is moved into the open space around the pressure block 30 to dispense a polymer adhesive 141 into the through holes 123 of the tray 12 and the adhesive troughs 24 of the base block 20 (see FIG. 5). Thereafter, the dispensed polymer adhesive is cured, forming rubber pads 128 at the tray 12. Thereafter, remove the base block 20 and the pressure block 30 from the tray 12, finishing the operation.

Because the tray body 121, the axle 125 and the rubber pads 128 are installed by means of the spindle motor tray adhesive-dispensing supplementary apparatus 10, the perpendicularity between the top wall of each rubber pad 128 and the axle 125 can easily be controlled subject to the precision of the spindle motor tray adhesive-dispensing supplementary apparatus 10, improving the spindle motor yield rate. Further, the top side of the base block 20 and the tray 12 and the area around the pressure block 30 are kept open, facilitating movement and alignment of the adhesive dispenser. Further, a gap 26 is kept between the tray body 121 of the tray 12 and the base block 20 to facilitate ventilation, allowing discharge of air out of the adhesive troughs 24 to the outside open air. Further, the grooves 243 on the top wall of each insertion member 241 enable a coarse surface to be formed on each rubber pad 128 to facilitate moving a CD disk.

Further, the pressure block 30 can be made having a V-groove to substitute for the guide hole 34 of the pressure block 30. In this case, the pin shaft 44 of the positioning pin 40 and the axle 125 of the tray 12 are stopped at the V-groove and kept in axial alignment. Other tri-axis or multi-axis concentric positioning equivalent measures may be selectively used.

Further, in the present preferred embodiment, the support pin 50 is supported on the spring member 60. However, this arrangement is not a limitation. Alternatively, the support pin 50 can be kept constantly at a predetermined elevation or vertically adjustably controlled by means of an adjustment device, eliminating the use of the aforesaid spring member 60.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A spindle motor tray adhesive dispensing method, comprising the steps of:
   (a) sandwiching a tray between a base block and a pressure block to keep an open space above said base block and around said pressure block, wherein said base block comprises at least one adhesive trough; said tray comprises a tray body having at least one through hole corresponding to said at least one adhesive trough, and an axle at the center of said tray body;
   (b) moving an adhesive dispenser into the open space above said base block and around said pressure block and then operating said adhesive dispenser to dispense a polymer adhesive to said at least one through hole of said tray and said at least one adhesive trough of said base block; and
   (c) removing said base block and said pressure block from said tray after curing of the dispensed polymer adhesive.

2. The spindle motor tray adhesive dispensing method as claimed in claim 1, wherein the base block used in said step (a) comprises a blind hole for receiving one end of the axle of said tray, a spring member mounted in said blind hole, and a support pin supported on said spring member in said blind hole and stopped against the axle of said tray.

* * * * *